United States Patent
Xu

(10) Patent No.: US 12,439,374 B2
(45) Date of Patent: Oct. 7, 2025

(54) METHOD AND DEVICE FOR INFORMATION TRANSMISSION AND RELATED EQUIPMENT

(71) Applicant: SPREADTRUM COMMUNICATIONS (SHANGHAI) CO., LTD., Shanghai (CN)

(72) Inventor: Min Xu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 647 days.

(21) Appl. No.: 17/794,008

(22) PCT Filed: Feb. 25, 2021

(86) PCT No.: PCT/CN2021/077773
§ 371 (c)(1),
(2) Date: Jul. 26, 2022

(87) PCT Pub. No.: WO2021/148053
PCT Pub. Date: Jul. 29, 2021

(65) Prior Publication Data
US 2023/0042774 A1 Feb. 9, 2023

(30) Foreign Application Priority Data
Jan. 20, 2020 (CN) .......................... 202010067330.8

(51) Int. Cl.
*H04W 68/02* (2009.01)
*H04W 16/28* (2009.01)
(Continued)

(52) U.S. Cl.
CPC ........... *H04W 68/02* (2013.01); *H04W 16/28* (2013.01); *H04W 72/1273* (2013.01); *H04W 72/23* (2023.01)

(58) Field of Classification Search
CPC .... H04L 12/189; H04B 17/318; H04W 68/02; H04W 72/005; H04W 72/044; H04W 74/0833; H04W 72/048
See application file for complete search history.

(56) References Cited

U.S. PATENT DOCUMENTS

2018/0199309 A1* 7/2018 Islam ...................... H04B 7/088
2018/0270790 A1 9/2018 Shi et al.
(Continued)

FOREIGN PATENT DOCUMENTS

CN 103444116 A 12/2013
CN 103716828 A 4/2014
(Continued)

OTHER PUBLICATIONS

Extended European search report issued for EP application No. 21744031.2 mailed on Jan. 25, 2024, 10 Pages.
(Continued)

*Primary Examiner* — Iqbal Zaidi
(74) *Attorney, Agent, or Firm* — HAUPTMAN HAM, LLP

(57) ABSTRACT

A method and device for information transmission, and related equipment are provided. An access network device transmits a paging message, where the paging message contains resource indication information of a user equipment (UE), and the resource indication information indicates an uplink transmission resource of the UE. The access network device receives information transmitted by the UE on the uplink transmission resource.

20 Claims, 6 Drawing Sheets

(51) Int. Cl.
*H04W 72/1273* (2023.01)
*H04W 72/23* (2023.01)

(56) References Cited

U.S. PATENT DOCUMENTS

2019/0356524 A1* 11/2019 Yi .................... H04B 7/0617
2020/0163048 A1* 5/2020 Kim .................... H04W 72/12

FOREIGN PATENT DOCUMENTS

| | | |
|---|---|---|
| CN | 104838709 A | 8/2015 |
| CN | 105680987 A | 6/2016 |
| CN | 105992373 A | 10/2016 |
| CN | 107005966 A | 8/2017 |
| CN | 107027175 A | 8/2017 |
| CN | 107666708 A | 2/2018 |
| CN | 108366422 A | 8/2018 |
| CN | 108966243 A | 12/2018 |
| CN | 109152046 A | 1/2019 |
| CN | 109302720 A | 2/2019 |
| CN | 109391905 A | 2/2019 |
| CN | 109392109 A | 2/2019 |
| CN | 109699843 A | 5/2019 |
| CN | 110168945 A | 8/2019 |
| CN | 110475340 A | 11/2019 |
| CN | 110621068 A | 12/2019 |
| EP | 3358894 A1 | 8/2018 |
| WO | 2017129127 A1 | 8/2017 |
| WO | 2017176438 A1 | 10/2017 |
| WO | 2019006807 A1 | 1/2019 |

OTHER PUBLICATIONS

WIPO, International Search Report and Written Opinion for International Application No. PCT/CN2021/077773, Apr. 28, 2021.
The first office action issued in corresponding CN application No. 202010067330.8 dated Jun. 21, 2021.
The second office action issued in corresponding CN application No. 202010067330.8 dated Jan. 25, 2022.
The third office action issued in corresponding CN application No. 202010067330.8 dated Apr. 27, 2022.

* cited by examiner

METHOD AND DEVICE FOR INFORMATION TRANSMISSION AND RELATED EQUIPMENT

CROSS-REFERENCE TO RELATED APPLICATION(S)

This application is a National Stage of International Application No. PCT/CN2021/077773, field Feb. 25, 2021, which claims priority to Chinese Patent Application No. 202010067330.8, filed Jan. 20, 2020, the entire disclosures of which are hereby incorporated by reference.

TECHNICAL FIELD

This application relates to the field of communication technologies, and particularly to a method and device for information transmission and related equipment.

BACKGROUND

In the 5th generation (5G) new radio (NR), a user equipment (UE) has three states in an air interface: an idle state, an inactive state, and a connected state. For a UE in an idle state or an inactive state, when the UE needs to perform uplink data transmission, the UE can initiate uplink transmission on a common resource. For example, after receiving a paging message, the UE performs random access on a common resource. However, when performing random access on a common resource, multiple UEs may select a same common resource for random access at the same time, resulting in an increase in probability of collision between UEs and an increase in access delay. Therefore, how to avoid uplink-transmission-resource collision between UEs has become a problem to-be-solved.

SUMMARY

In a first aspect, implementations of the disclosure provide a method for information transmission. The method includes: transmitting a paging message, where the paging message contains resource indication information of a user equipment (UE), and the resource indication information indicates an uplink transmission resource of the UE; and receiving information transmitted by the UE on the uplink transmission resource.

In a second aspect, implementations of the disclosure provide a method for information transmission. The method includes: receiving a paging message from an access network device, where the paging message contains resource indication information of a UE, and the resource indication information indicates an uplink transmission resource of the UE; and transmitting information to the access network device on the uplink transmission resource.

In a third aspect, implementations of the disclosure provide an access network device. The access network device includes a transceiver, a memory, and a processor. The memory is coupled with the transceiver and stores program codes. The processor is coupled with the transceiver and the memory, and is configured to execute the program codes to cause the transceiver to execute the method in the first aspect.

In a fourth aspect, implementations of the disclosure provide a UE. The UE includes a transceiver, a memory, and a processor. The memory is coupled with the transceiver and stores program codes. The processor is coupled with the transceiver and the memory, and is configured to execute the program codes to cause the transceiver to execute the method in the second aspect.

BRIEF DESCRIPTION OF THE DRAWINGS

In order to describe technical solutions of implementations of the disclosure or the related art more clearly, the following will give a brief description of accompanying drawings used for describing the implementations or the related art. Apparently, accompanying drawings described below are merely some implementations. Those of ordinary skill in the art can also obtain other accompanying drawings based on the accompanying drawings described below without creative efforts.

DETAILED DESCRIPTION

Hereinafter, technical solutions of implementations of disclosure will be described clearly and completely with reference to accompanying drawings in the implementations. Apparently, implementations described below are merely some implementations, rather than all implementations of the disclosure. All other implementations obtained by those of ordinary skill in the art based on the implementations without creative efforts shall fall within the protection scope of the disclosure.

In the new radio (NR) specified by the 3rd Generation Partnership Project (3GPP), a user equipment (UE) has three states in an air interface: an idle state, an inactive state, and a connected state. The idle state refers to that the UE is not connected with an access network device, and the UE only needs to periodically initiate location update, perform cell selection and reselection, and receive paging. The connected state refers to that the UE is connected with a network, and the network can configure configuration of a physical layer and a radio bearer (RB) of the UE, and can also perform uplink (or downlink) data scheduling for the UE. The inactive state refers to that the UE does not need to notify an access network device when moving within a certain access range, but the UE retains certain configurations. When a network needs to schedule a UE in an inactive state or when a UE needs to transmit information to a network, the UE can transmit information on a common resource. It can be understood that, a UE in an idle state and a UE in an inactive state are collectively referred to as "UE in a disconnected state".

Figure 1:
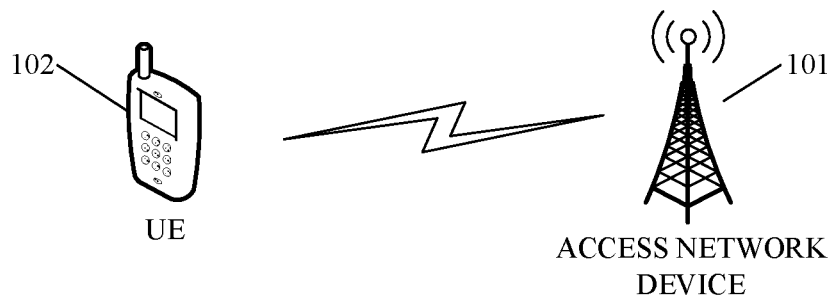
FIG. 1 is a schematic diagram illustrating a communication system provided in implementations of the disclosure.

FIG. 1 illustrates a communication system provided in implementations of the disclosure. The communication system includes an access network device 101 and a UE 102. The access network device 101 is a network-side device, and is used to provide a wireless communication function, for example, transmitting a paging message to the UE 102, or receiving uplink data from the UE 102. The UE 102 is a user-side device, and is used for wireless transmission and reception, for example, transmitting a request message to the access network device 101, or receiving downlink data from the access network device 101.

The "access network device" in implementations of the disclosure is a device deployed in a radio access network (RAN) to provide a wireless communication function. For example, the access network device of implementations of the disclosure may be a base transceiver station (BTS) in a 2nd generation (2G) network, a NodeB or a radio network controller (RNC) in a 3G network, an evolved NodeB (eNB) in a 4th generation (4G) network, a gNodeB (gNB) in a 5th generation (5G) NR, or a next generation eNB (ng-eNB). A base station in implementations of the disclosure may also include a device that provides a base station function in a new communication system in the future, and the like. The access network device in implementations of the disclosure may also be an access point (AP) device in a wireless local area network (WLAN), etc., which is not limited in implementations of the disclosure.

The "UE" in implementations of the disclosure may refer to various forms of access terminals, subscriber units, subscriber stations, mobile stations (MS), remote stations, remote terminals, and mobile equipment, user terminals, terminal equipment, wireless communication equipment, user agents, or user device. The UE may also be a cellular telephone, a cordless telephone, a session initiation protocol (SIP) telephone, a wireless local loop (WLL) station, a personal digital assistant (PDA), a handheld device with a wireless communication function, a computing device, other processing devices coupled with a wireless modem, an in-vehicle device, a wearable device, terminal equipment in a future 5G network or terminal equipment in a future evolved public land mobile network (PLMN), etc., which is not limited in implementations of the disclosure.

The following definitions are given in implementations of the disclosure: one-way communication link from an access network device to a UE is a downlink, data transmitted on the downlink is downlink data, and a transmission direction of the downlink data is referred to as a downlink direction; on the contrary, one-way communication link from the UE to the access network device is an uplink, data transmitted on the uplink is uplink data, and a transmission direction of the uplink data is referred to as an uplink direction.

Figure 2:
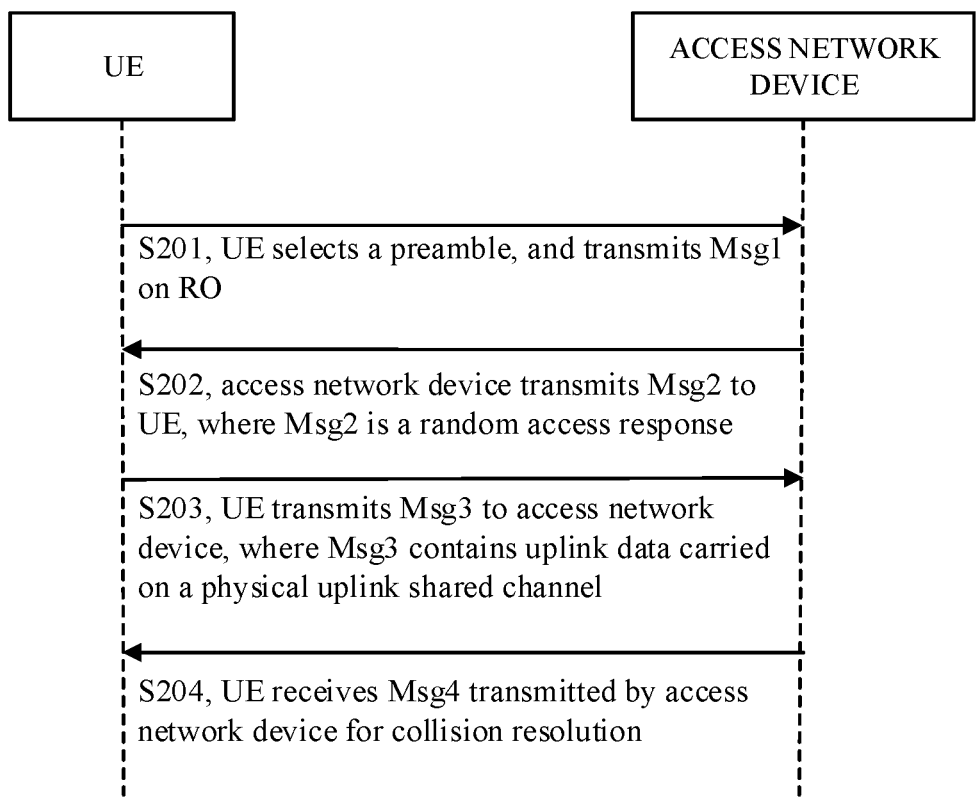
FIG. 2 is a schematic flowchart illustrating a method for contention based random access (CBRA).

As an example, in a mobile originated (MO) scenario, that is, when a UE in a disconnected state needs to transmit information to a network, the UE can use a common resource for random access. A random access procedure initiated by the UE includes contention based random access (CBRA) and contention free random access (CFRA). If the UE performs random access based on the CBRA, a four-step random access procedure is adopted to complete the random access, and the four-step random access procedure is illustrated in FIG. 2.

At S201, the UE selects a synchronization signal and physical broadcast channel block (SSB) from SSBs that meet a condition or a channel state information-reference signal (CSI-RS) from CSI-RSs that meet a condition, selects a preamble, and transmits Msg1 (information 1) on a physical random access channel (PRACH) occasion (RO).

At S202, an access network device transmits Msg2 to the UE, where Msg2 is a random access response (RAR), and accordingly, the UE receives an RAR message by detecting RA-RNTI scrambled physical downlink control channel (PDCCH), where the RAR message includes a timing advance command (TAC), and the TAC carries TA information.

At S203, the UE transmits Msg3 to the access network device, where Msg3 contains uplink data carried on a physical uplink shared channel (PUSCH).

At S204, the UE receives Msg4 transmitted by the access network device, where Msg4 contains a PDCCH message. If received PDCCH carries contention resolution identity MAC control element (MAC CE), it means that collision resolution is successful.

Figure 3:
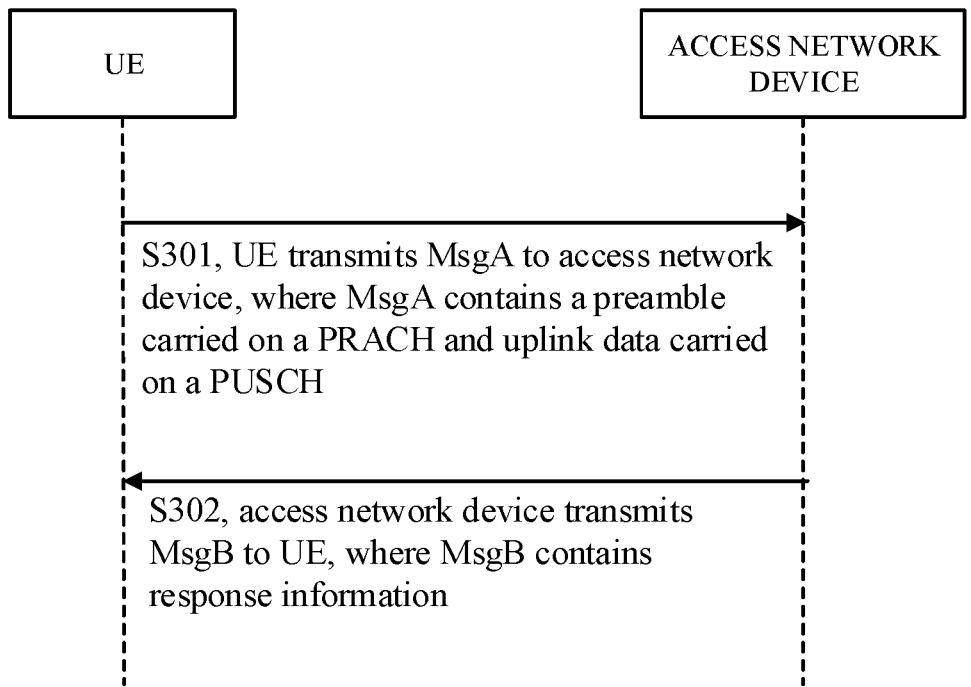
FIG. 3 is a schematic flowchart illustrating a method for contention free random access (CFRA).

In some implementations, if the UE performs random access based on the CFRA, a two-step random access procedure is adopted to complete the random access, as illustrated in FIG. 3.

At S301, the UE transmits MsgA to an access network device, where MsgA contains a preamble carried on a PRACH and uplink data carried on a PUSCH.

At S302, an access network device transmits MsgB to the UE, where MsgB contains response information.

The MsgA illustrated in FIG. 3 contains information in Msg1 and Msg3 illustrated in FIG. 2, that is, containing the preamble transmitted on the PRACH and payload transmitted on the PUSCH, for example, a time-frequency domain resource for payload transmission (PO). The MsgB illustrated in FIG. 3 contains information in Msg2 and Msg4 illustrated in FIG. 2.

As an example, in a mobile terminated (MT) scenario, that is, when a UE in a disconnected state needs to receive data on a downlink from a network, the access network device can transmit a paging message to a UE within an access range of the access network device. After receiving the paging message, the UE can use a common resource for random access. Also, random access initiated by the UE may be random access based on CBRA or random access based on CFRA.

However, no matter in the MO scenario or the MT scenario, especially in the MT scenario, when performing random access on a common resource, multiple UEs may select a same common resource for random access at the same time, resulting in an increase in probability of collision between UEs. Therefore, how to avoid uplink-transmission-resource collision between UEs has become a problem to-be-solved.

In order to avoid the uplink-transmission-resource collision between UEs, implementations of the disclosure provide a method for information transmission. According to the method, the access network device transmits a paging message, where the paging message contains resource indication information of a UE, and the resource indication information indicates an uplink transmission resource of the UE; and the access network device receives information transmitted by the UE on the uplink transmission resource.

As can be seen, the access network device can indicate a corresponding uplink transmission resource for the UE by carrying the resource indication information for the UE in the paging message, so that the UE can perform information transmission on the corresponding uplink transmission resource, which can reduce a probability of resource collision between UEs.

Figure 4:
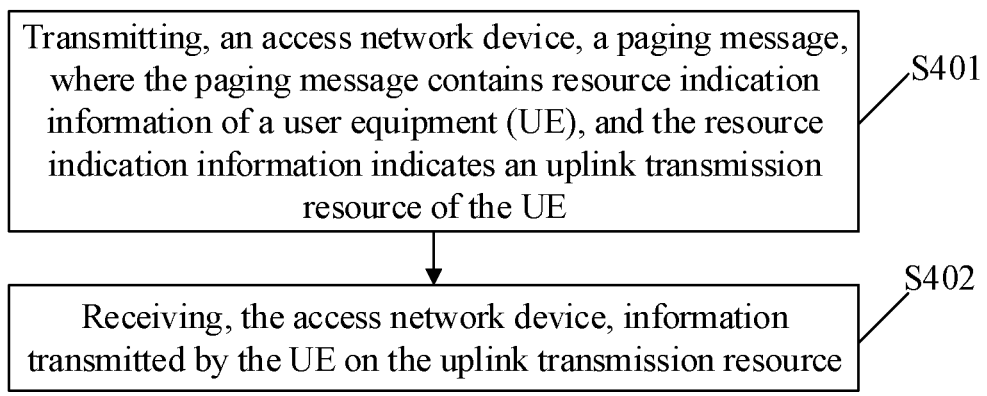
FIG. 4 is a schematic flowchart illustrating a method for information transmission provided in implementations of the disclosure.

Implementations of the disclosure provide a method for information transmission. The method can be performed by an access network device. As illustrated in FIG. 4, the method includes the following.

At S401, the access network device transmits a paging message, where the paging message contains resource indication information of a UE, and the resource indication information indicates an uplink transmission resource of the UE.

Figure 5A:
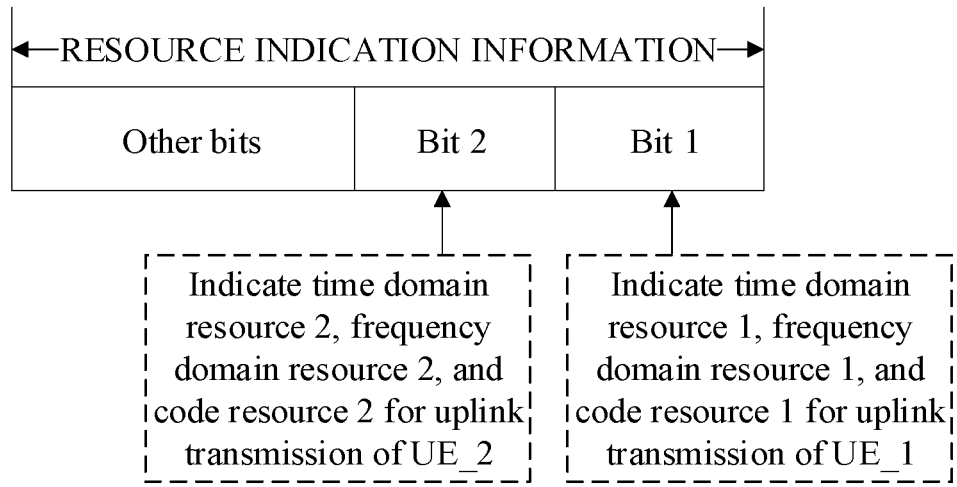
FIG. 5A is a schematic diagram illustrating resource indication information provided in implementations of the disclosure.

For a UE in a disconnected state, when the access network device needs to establish a connection with the UE, the connection can be established by initiating paging. The initiating paging by the access network device may be transmitting a paging message to the UE in the disconnected state. For example, the access network device transmits a paging message to the UE through a paging channel of a cell where the UE is located. When receiving the paging message, the UE in the disconnected state uses a common resource to establish the connection. In implementations of the disclosure, in order to distinguish common resources used by UEs, the access network device can transmit a paging message carrying resource indication information of the UE, where the resource indication information indicates an uplink transmission resource of the UE. The uplink transmission resource of the UE may include, but is not limited to, a time domain resource, a frequency domain resource, and a code resource for uplink transmission of the UE. The uplink transmission resource of the UE may also be a PO resource or other uplink resources (including preconfigured uplink (UL) resource, etc.) for UE UL information transmission. In some implementations, the resource indication information can directly indicate a corresponding uplink transmission resource. For instance, as illustrated in FIG. 5A, bit 1 in the resource indication information indicates time domain resource 1, frequency domain resource 1, and code resource 1 corresponding to UE_1, and bit 2 in the resource indication information indicates time domain resource 2, frequency domain resource 2, and code resource 2 corresponding to UE_2. It can be understood that, the resource indication information may further has other bits, and the other bits may indicate uplink transmission resources of other UEs, which is not limited in this implementation. The resource indication information may have multiple bits. Alternatively, in the paging message, one or more bits following an identification of a UE indicate an uplink transmission resource corresponding to the UE.

Figure 5B:
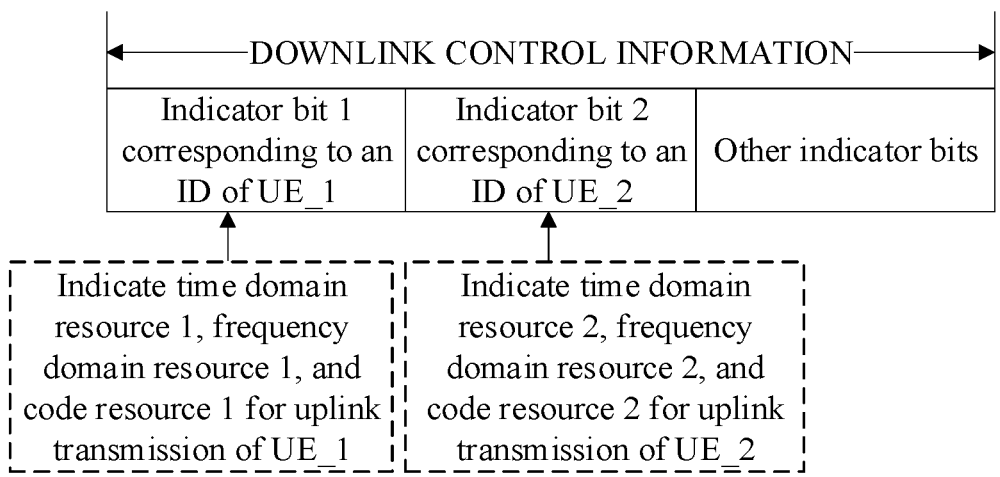
FIG. 5B is a schematic diagram illustrating another resource indication information provided in implementations of the disclosure.

In some implementations, the resource indication information is carried in downlink control information (DCI). In addition to indicating scheduling information of the paging message, the DCI can also indicate a transmission resource (s) of a corresponding UE(s) in the paging message, including one or more of a time domain resource, a frequency domain resource, a code resource, etc. For example, the paging message contains identifications (ID) of multiple UEs, and the DCI indicates a transmission resource of each of the UEs according to the identifications of multiple UEs in the paging message. Specifically, transmission resources may be indicated in sequence, or indicated according to indicator bits. The access network device configures an uplink transmission resource for UE_1. UE_1 receives a paging message, determines that the paging message carries indicator bit 1 corresponding to an ID of UE_1, where indicator bit 1 indicates that a transmission resource is configured for UE_1, and determines indicated transmission resource at position 1 of resources indicated by the DCI. Similarly, the access network device configures an uplink transmission resource for UE_2. UE_2 receives a paging message, determines that the paging message carries indicator bit 2 corresponding to an ID of UE_2, where indicator bit 2 indicates that a transmission resource is configured for UE_2, and determines indicated transmission resource at position 2 of resources indicated by the DCI, as illustrated in FIG. 5B. If the access network device does not configure an uplink transmission resource for UE_3, UE_3 receives a paging message and determines that the paging message carries an ID of UE_3 but does not carry any indicator bit corresponds to the ID of UE_3, then UE_3 does not need to obtain a transmission resource from resources indicated by the DCI. It can be understood that, the DCI may further has other indicator bits, and the other indicator bits may indicate uplink transmission resources of other UEs, which is not limited in this implementation.

In some implementations, the resource indication information contains an index of a preconfigured uplink resource of the UE. The index of the preconfigured uplink resource of the UE indicates a resource in a preconfigured resource list. The preconfigured resource list is a resource list transmitted by the access network device to the UE in a preconfigured manner. For example, the access network device can broadcast the resource list through a system message, or configure the resource list through a radio resource control (RRC) release message. After receiving the preconfigured resource list, the UE stores the resource list. A resource list is illustrated in Table 1 below.

TABLE 1

| A preconfigured resource list | | | |
|---|---|---|---|
| Resource 1 | Resource 2 | Resource 3 | Resource 4 |
| index_1 | index_2 | index_3 | index_4 |

In the preconfigured resource list, resources are in one-to-one correspondence with indexes. According to an index, a resource corresponding to the index can be found in the preconfigured resource list. If the resource list is configured in an RRC release message, the UE ignores the resource list in a system message.

In some implementations, the paging message further contains preamble information, where the preamble information indicates the UE to transmit a preamble on a corresponding resource. If the UE needs to transmit a preamble to obtain TA information, a corresponding non-contention preamble resource is used to transmit the preamble. If the UE does not need to transmit a preamble (e.g., the TA of the UE is valid), the paging message will not carry the preamble information.

In some implementations, the paging message further contains second indication information, where the second indication information indicates a downlink scheduling resource of the access network device for the UE. The second indication information may include, but is not limited to, downlink semi-persistent scheduling (DL SPS) information, configured grant (CG) information or preconfigured downlink resource (PDR) information, etc. The second indication information is that the access network device can use a resource indicated by the second indication information to perform TA information and/or data scheduling. It should be noted that, when indicating the downlink scheduling resource for the UE through the second indication information, the access network device no longer needs to configure resource information through DCI for dynamic resource scheduling every time, but can directly schedule data on a corresponding resource, thereby improving an efficiency of data scheduling of the access network device.

At S402, the access network device receives information transmitted by the UE on the uplink transmission resource.

After receiving the paging message, the UE can use the uplink transmission resource indicated by the resource indication information to transmit information, and accordingly, the access network device receives the information transmitted by the UE on the corresponding uplink transmission resource. The information transmitted by the UE on the corresponding uplink transmission resource may include, but is not limited to, an RRC message, buffer status report (BSR) information, a UE ID, a non-access stratum data packet, first indication information, etc. As an example, the UE transmits an RRC message (corresponding to Msg3 in the four-step random access procedure) to the access network device on a corresponding uplink transmission resource. As another example, the UE transmits a data packet to the access network device on a corresponding uplink transmission resource, so as to achieve uplink data transmission.

In some implementations, the information transmitted by the UE on the corresponding uplink transmission resource includes first indication information, and accordingly, the access network device receives the first indication information from the UE, where the first indication information includes beam indication information and/or channel state information (CSI), and the first indication information indicates the access network device to perform downlink scheduling according to the first indication information.

If the first indication information is beam indication information, the beam indication information is generated once the UE receives the paging message in a beam. For example, the access network device transmits the paging message in all transmit beams. If UE_1 receives the paging message in receive beam 1 corresponding to transmit beam 1, UE_1 generates beam indication information, where the beam indication information indicates that UE_1 corresponds to beam 1. The beam indication information is reported by the UE to the access network device, and is used to notify the access network device in which beam the UE receives the paging message. After receiving the beam indication information, the access network device can continue to transmit data to the UE in a transmit beam corresponding to the beam indication information next time.

If the first indication information is channel state information, the channel state information contains information used to assist a base station to perform downlink scheduling, such as a channel quality indication (CQI). The CQI is mainly used to evaluate a downlink channel quality of a cell, which is measured and reported by the UE. The UE measures a corresponding reference signal according to a high-layer instruction, and then reports a CQI report. The access network device receives the CQI report, and determines whether related configurations of a modulation mode, resource allocation, and multiple-input multiple-output (MIMO) of the UE need to be adjusted, according to a current network-resource situation.

In another implementation, the UE may not report beam indication information. Paging messages transmitted by the access network device in different beams carry different preamble resources and/or uplink transmission resources, where preamble resources and/or uplink transmission resources are in one-to-one correspondence with beams. After receiving a paging message, the UE uses a corresponding preamble or data transmission resource to transmit data. The access network device obtains information of a downlink transmit beam according to received data. For example, the access network device configures data transmission resource 1 for UE_1 in beam 1, and configures data transmission resource 2 for UE_2 in beam 2. If UE_1 receives a paging message on receive beam 1 corresponding to transmit beam 1, UE_1 uses data transmission resource 1 for data transmission. Accordingly, the access network device receives information transmitted by UE_1 on data transmission resource 1, and determines to transmit data to UE_1 in transmit beam 1 corresponding to beam 1 next time.

In the method for information transmission of implementations of the disclosure, the access network device transmits the paging message, where the paging message contains the resource indication information of the UE, and the resource indication information indicates the uplink transmission resource of the UE; and the access network device receives the information transmitted by the UE on the uplink transmission resource. As can be seen, the access network device can indicate a corresponding uplink transmission resource for the UE by carrying the resource indication information for the UE in the paging message, so that the UE can perform information transmission on the corresponding uplink transmission resource, which can reduce a probability of resource collision between UEs, and shorten time for accessing by the UE a network and time for reception data scheduling. Moreover, the UE reports the first indication information on the uplink transmission resource, so that a base station can implement more efficient data scheduling based on information reported by the UE.

Figure 6:
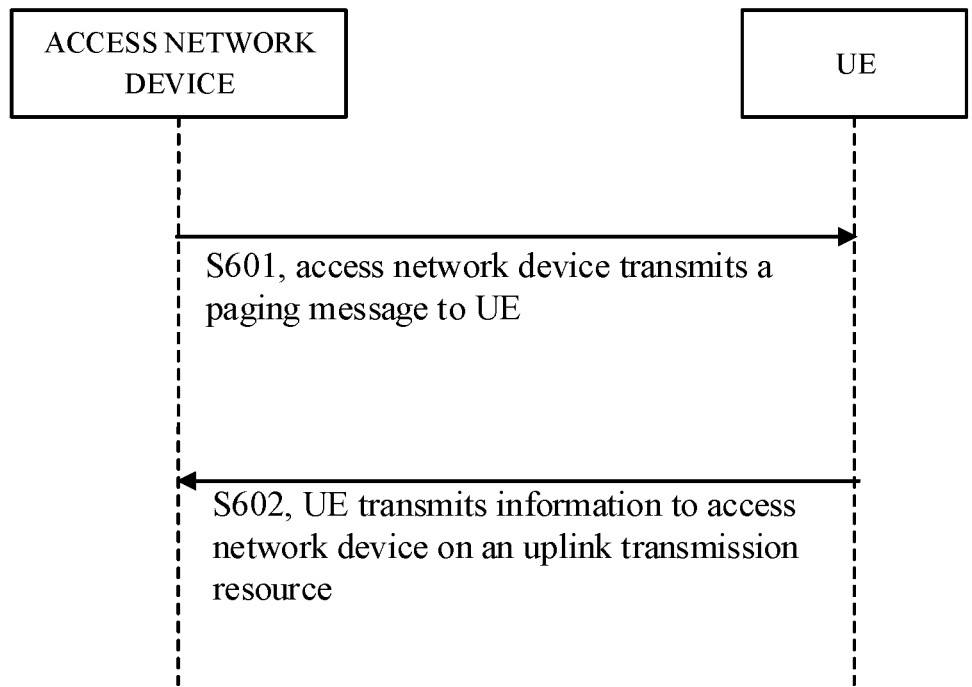
FIG. 6 is a schematic flowchart illustrating another method for information transmission provided in implementations of the disclosure.

Implementations of the disclosure provide another method for information transmission. The method can be performed by a UE. As illustrated in FIG. 6, the method includes the following.

At S601, an access network device transmits a paging message to the UE, and accordingly, the UE receives the paging message from the access network device.

For details of the operation of transmitting by the access network device the paging message to the UE, reference may be made to description corresponding to S401 in the implementation illustrated in FIG. 4, which will not be repeated herein.

The UE can receive the paging message, where the paging message contains resource indication information of the UE, and the resource indication information indicates an uplink transmission resource of the UE. In some implementations, the paging message is scheduled through downlink control indication information, where the downlink control indication information contains the resource indication information. It can be understood that, for details of the resource indication information and the downlink control indication information, reference may be made to corresponding description of the implementation illustrated in FIG. 4, which will not be repeated herein.

In some implementations, if the resource indication information in the paging message contains an index of a preconfigured uplink resource of the UE, after receiving the paging message, the UE can determine the uplink transmission resource of the UE according to the index. As an example, after the UE receives the paging message from the access network device, if the resource indication information in the paging message contains an index of a preconfigured uplink resource of the UE, the UE searches for a corresponding resource in a resource list (e.g., the preconfigured resource list illustrated in Table 1) according to the index as the uplink transmission resource. For instance, the resource indication information in the paging message received by UE_1 contains an index of index_1, according to the resource list, UE_1 can determine to use resource 1 corresponding to index_1 for data transmission.

In some implementations, the paging message further contains preamble information, where the preamble information indicates the UE to transmit a preamble on a corresponding resource. After receiving a paging message containing preamble information, the UE can further transmit, according to the preamble information, a preamble to the access network device on a corresponding resource. The UE can transmit the preamble to the access network device, to obtain TA information through the preamble. The UE can determine a corresponding TA offset according to the TA information, and determine time for transmitting uplink data to the access network device according to the TA offset.

In some implementations, after receiving the paging message from the access network device, the UE further determines a radio network temporary identifier (RNTI) of the UE according to the resource indication information, where the RNTI of the UE corresponds to the resource indication information.

The RNTI may be a cell RNTI (C-RNTI) or other identifications used for UE scheduling. The RNTI of the UE can be used as an ID of the UE within a cell coverage of the UE and the access network device, that is, the RNTI of the UE can be used as a UE ID. The resource indication information and the RNTI of the UE are in one-to-one correspondence. That is, after receiving the paging message, the UE can search for a corresponding RNTI through the resource indication information. It is known that the resource indication information can indicate an uplink transmission resource, and therefore the UE can search for a corresponding RNTI according to the uplink transmission resource of the UE. The access network device may configure a correspondence between multiple RNTIs and multiple uplink transmission resources in advance. As an example, the correspondence between uplink transmission resources and RNTIs is configured through an SIB or RRC release message. After determining an RNTI to-be-used according to the resource indication information, the UE can use a corresponding RNTI for data transmission. For instance, according to the resource indication information, UE_1 determines that an RNTI to-be-used is RNTI 1, and therefore UE_1 can use RNTI 1 for information transmission. It should be noted that, the access network device may also specify that an RNTI preconfigured to the UE by a cell(s) within a certain range is valid. When the UE moves within a coverage of these cells, the RNTI of the UE does not need to be re-determined and can be used directly. As an example, the access network device configures an RNTI for the UE and specifies that the RNTI is valid when the UE moves in a cell(s) within a certain range. The cell(s) within the certain range specified by the access network device may be limited to a cell(s) of a certain value range in a cell identifier list, or may be limited by an RAN-based notification area (RNA), or may be limited based on a physical cell identifier (PCI) list. For instance, the cell(s) specified by the access network device is a cell(s) of a certain value range in a cell identifier list (e.g., cell_1 and cell_2), when the UE moves within a coverage of cell_1 and cell_2, the UE does not need to re-determine a corresponding RNTI according to the resource indication information.

In some implementations, the paging message further contains second indication information, where the second indication information indicates a downlink scheduling resource of the access network device for the UE. After receiving the second indication information, the UE further receives information from the access network device on the downlink scheduling resource of the access network device for the UE.

The information received by the UE on the downlink scheduling resource for the UE is information for the UE, so that the access network device can implement more efficient data scheduling.

At S602, the UE transmits information to the access network device on the uplink transmission resource, and accordingly, the access network device receives the information from the UE.

For details of the operation of receiving by the access network device the information from the UE, reference may be made to description corresponding to S402 in the implementation illustrated in FIG. 4, which will not be repeated herein.

After receiving the paging message, the UE can use the uplink transmission resource indicated by the resource indication information to perform information transmission. The information transmitted by the UE on the corresponding uplink transmission resource may include, but is not limited to, an RRC message, a BSR message, a UE ID, a non-access stratum data packet, first indication information, etc. For details of description, reference may be made to description of the information transmitted by the UE on the corresponding uplink transmission resource in S402 in the implementation illustrated in FIG. 4, which will not be repeated herein.

In some implementations, the UE transmits the information to the access network device on the uplink transmission resource as follows. The UE transmits first indication information to the access network device on the uplink transmission resource, where the first indication information includes beam indication information and/or channel state information, and the first indication information indicates the access network device to perform downlink scheduling according to the first indication information.

For details of description of the first indication information, reference may be made to description of the first indication information in the implementation illustrated in FIG. 4, which will not be repeated herein. The UE can transmit the first indication information to the access network device, so that the access network device can perform resource scheduling more flexibly and efficiently according to the first indication information.

In the method for information transmission of implementations of the disclosure, the access network device transmits the paging message to the UE, where the paging message contains the resource indication information of the UE, and the resource indication information indicates the uplink transmission resource of the UE; the UE transmits the information to the access network device on the uplink transmission resource after receiving the paging message. As can be seen, the access network device can indicate a corresponding uplink transmission resource for the UE by carrying the resource indication information for the UE in the paging message, so that the UE can perform information transmission on the corresponding uplink transmission resource, which can reduce a probability of resource collision between UEs, and shorten time for accessing by the UE a network and time for reception data scheduling. Moreover, the UE reports the first indication information on the uplink transmission resource, so that a base station can implement more efficient data scheduling based on information reported by the UE.

Figure 7:
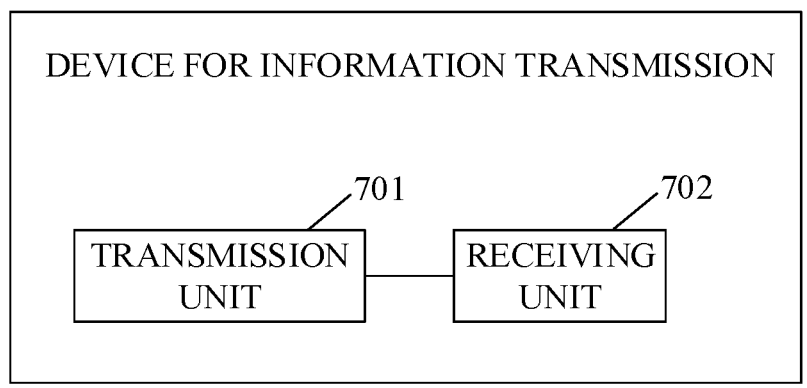
FIG. 7 is a schematic structural diagram illustrating a device for information transmission provided in implementations of the disclosure.

Based on description of the implementations of the foregoing method for information transmission, implementations of the disclosure provide a device for information transmission. The device for information transmission may be a computer program run in an access network device, and may be applied to the foregoing method implementations to execute respective operations of the method for information transmission performed by the access network device. Referring to FIG. 7, the device includes a transmission unit 701 and a receiving unit 702. The transmission unit 701 is configured to transmit a paging message, where the paging message contains resource indication information of a UE, and the resource indication information indicates an uplink transmission resource of the UE. The receiving unit 702 is configured to receive information transmitted by the UE on the uplink transmission resource.

In some implementations, the paging message further contains downlink control indication information, where the downlink control indication information contains the resource indication information.

In some implementations, the resource indication information contains an index of a preconfigured uplink resource of the UE.

In some implementations, the paging message further contains preamble information, where the preamble information indicates the UE to transmit a preamble on a corresponding resource.

In some implementations, the receiving unit 702 configured to receive the information transmitted by the UE on the uplink transmission resource is specifically configured to: receive first indication information from the UE, where the first indication information includes beam indication information and/or channel state information, and the first indication information indicates an access network device to perform downlink scheduling according to the first indication information.

In some implementations, the paging message further contains second indication information, where the second indication information indicates a downlink scheduling resource of an access network device for the UE.

Figure 8:
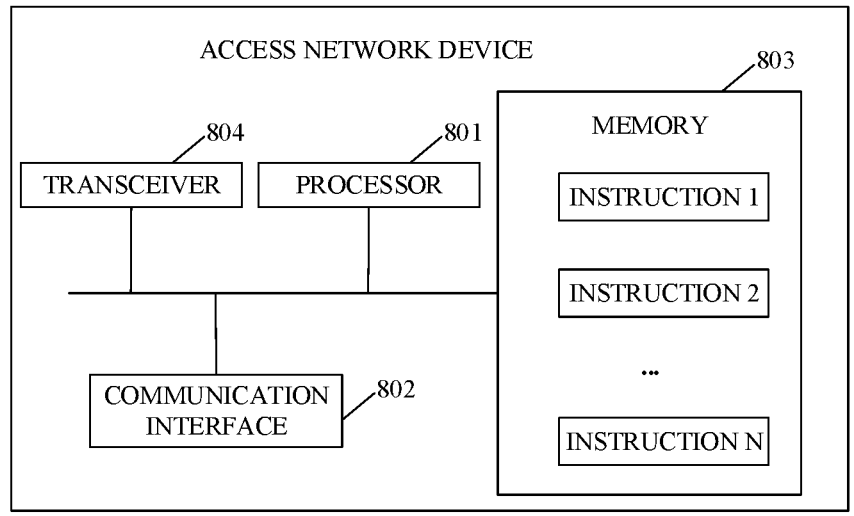
FIG. 8 is a schematic structural diagram illustrating an access network device provided in implementations of the disclosure.

Implementations of the disclosure further provide an access network device. The access network device can be applied to the foregoing method for information transmission to execute respective operations of the method for information transmission. Referring to FIG. 8, an internal structure of the access network device includes a processor 801, a communication interface 802, a transceiver 804, and a memory 803. The processor 801, the communication interface 802, the transceiver 804, and the memory 803 of the access network device can be connected via a bus or through other means. FIG. 8 of implementations of the disclosure illustrates a connection via a bus as an example.

The communication interface 802 is a medium for realizing interaction and information exchange between the access network device and an external device. The processor 801, also called central processing unit (CPU), is a computing core and a control core of the access network device, and is suitable for implementing one or more instructions. Specifically, the processor is suitable for loading and executing one or more instructions to implement a corresponding method process or a corresponding function. The memory 803 is a memory device in the access network device, and is used to store programs and data. It should be understood that, the memory 803 herein includes not only a built-in storage medium of the access network device, but also an extended storage medium supported by the access network device. The memory 803 stores one or more instructions suitable for being loaded and executed by the processor 801, and these instructions may be one or more computer programs (including program codes).

In some implementations, the memory 803 stores one or more instructions, and the processor 801 is configured to load and execute the one or more instructions stored in the memory 803 to implement respective operations of the foregoing method implementations. In some implementations, the one or more instructions in the memory 803, when loaded and executed by the processor 801, are operable to execute: transmitting a paging message, where the paging message contains resource indication information of a UE, and the resource indication information indicates an uplink transmission resource of the UE; and receiving information transmitted by the UE on the uplink transmission resource.

In some implementations, the paging message further contains downlink control indication information, where the downlink control indication information contains the resource indication information.

In some implementations, the resource indication information contains an index of a preconfigured uplink resource of the UE.

In some implementations, the paging message further contains preamble information, where the preamble information indicates the UE to transmit a preamble on a corresponding resource.

In some implementations, the one or more instructions in the memory 803, when loaded and executed by the processor 801, are operable to execute: receiving first indication information from the UE, where the first indication information includes beam indication information and/or channel state information, and the first indication information indicates an access network device to perform downlink scheduling according to the first indication information.

In some implementations, the paging message further contains second indication information, where the second indication information indicates a downlink scheduling resource of an access network device for the UE.

Figure 9:
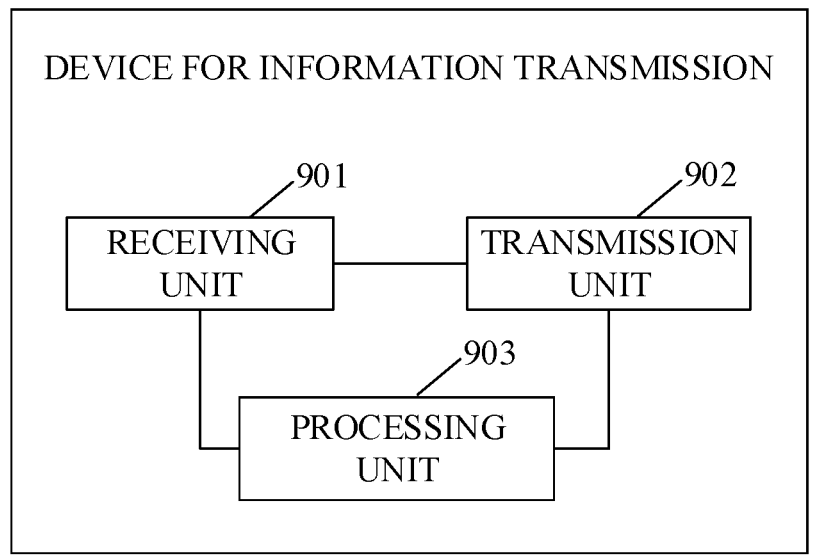
FIG. 9 is a schematic structural diagram illustrating another device for information transmission provided in implementations of the disclosure.

Implementations of the disclosure provide another device for information transmission. The device for information transmission may be a computer program run in a UE, and may be applied to the foregoing method implementations to execute respective operations of the method for information transmission performed by the UE. Referring to FIG. 9, the device includes a receiving unit 901 and a transmission unit 902. The receiving unit 901 is configured to receive a paging message from an access network device, where the paging message contains resource indication information of a UE, and the resource indication information indicates an uplink transmission resource of the UE. The transmission unit 902 is configured to transmit information to the access network device on the uplink transmission resource.

In some implementations, the paging message further contains downlink control indication information, where the downlink control indication information contains the resource indication information.

In some implementations, the resource indication information contains an index of a preconfigured uplink resource of the UE. The device further includes a processing unit 903 configured to: determine the uplink transmission resource of the UE according to the index.

In some implementations, the paging message further contains preamble information, the preamble information indicates the UE to transmit a preamble on a corresponding resource, and the transmission unit 902 is further configured to: transmit the preamble to the access network device on the corresponding resource according to the preamble information.

In some implementations, the processing unit 903 is further configured to: determine an RNTI of the UE according to the resource indication information, where the RNTI of the UE corresponds to the resource indication information.

In some implementations, the transmission unit 902 configured to transmit the information to the access network device on the uplink transmission resource is specifically configured to: transmit first indication information to the access network device on the uplink transmission resource, where the first indication information includes beam indication information and/or channel state information, and the first indication information indicates the access network device to perform downlink scheduling according to the first indication information.

In some implementations, the paging message further contains second indication information, the second indication information indicates a downlink scheduling resource of the access network device for the UE, and the receiving unit 901 is further configured to: receive information from the access network device on the downlink scheduling resource of the access network device for the UE.

Figure 10:
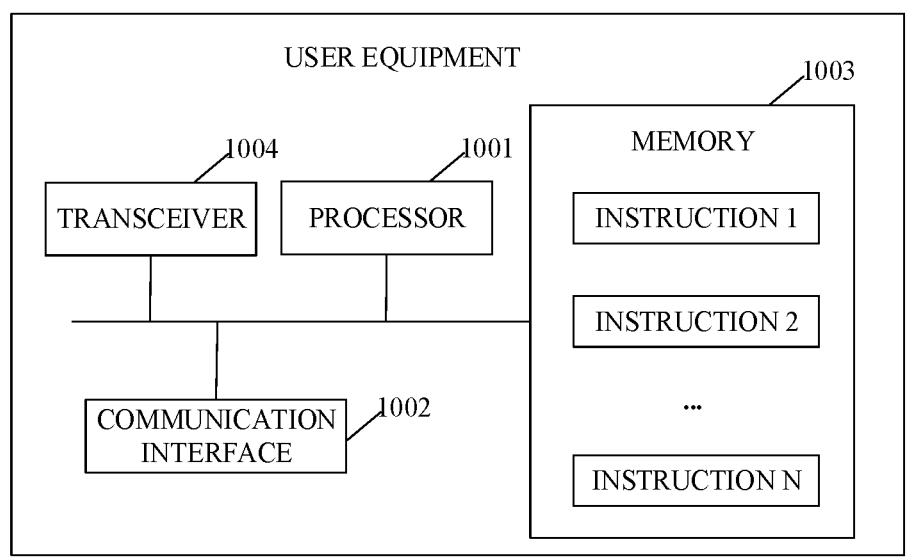
FIG. 10 is a schematic structural diagram illustrating a user equipment (UE) provided in implementations of the disclosure.

Based on description of the implementations of the foregoing method for information transmission, implementations of the disclosure further provide a UE. The UE can be applied to the foregoing method for information transmission to execute respective operations of the method for information transmission performed by the UE. Referring to FIG. 10, an internal structure of the UE includes a processor 1001, a communication interface 1002, a transceiver 1004, and a memory 1003. The processor 1001, the communication interface 1002, the transceiver 1004, and the memory 1003 of the UE can be connected via a bus or through other means. FIG. 10 of implementations of the disclosure illustrates a connection via a bus as an example.

The communication interface 1002 is a medium for realizing interaction and information exchange between the UE and an external device. The processor 1001, also called CPU, is a computing core and a control core of the UE, and is suitable for implementing one or more instructions. Specifically, the processor is suitable for loading and executing one or more instructions to implement a corresponding method process or a corresponding function. The memory 1003 is a memory device in the UE, and is used to store programs and data. It should be understood that, the memory 1003 herein includes not only a built-in storage medium of the UE, but also an extended storage medium supported by the UE. The memory 1003 stores one or more instructions suitable for being loaded and executed by the processor 1001, and these instructions may be one or more computer programs (including program codes).

In some implementations, the memory 1003 stores one or more instructions, and the processor 1001 is configured to load and execute the one or more instructions stored in the memory 1003 to implement respective operations of the foregoing method implementations. In some implementations, the one or more instructions in the memory 1003, when loaded and executed by the processor 1001, are operable to execute: receiving a paging message from an access network device, where the paging message contains resource indication information of a UE, and the resource indication information indicates an uplink transmission resource of the UE; and transmitting information to the access network device on the uplink transmission resource.

In some implementations, the paging message further contains downlink control indication information, where the downlink control indication information contains the resource indication information.

In some implementations, the resource indication information contains an index of a preconfigured uplink resource of the UE, and the one or more instructions in the memory 1003, when loaded and executed by the processor 1001, are further operable to execute: determining the uplink transmission resource of the UE according to the index.

In some implementations, the paging message further contains preamble information, the preamble information indicates the UE to transmit a preamble on a corresponding resource, and the one or more instructions in the memory 1003, when loaded and executed by the processor 1001, are further operable to execute: transmitting the preamble to the access network device on the corresponding resource according to the preamble information.

In some implementations, the one or more instructions in the memory 1003, when loaded and executed by the processor 1001, are further operable to execute: determining an RNTI of the UE according to the resource indication information, where the RNTI of the UE corresponds to the resource indication information.

In some implementations, the one or more instructions in the memory 1003, when loaded and executed by the processor 1001, operable to execute the operation of transmitting the information to the access network device on the uplink transmission resource are operable to execute: transmitting first indication information to the access network device on the uplink transmission resource, where the first indication information includes beam indication information and/or channel state information, and the first indication information indicates the access network device to perform downlink scheduling according to the first indication information.

In some implementations, the paging message further contains second indication information, the second indication information indicates a downlink scheduling resource of the access network device for the UE, and the one or more instructions in the memory 1003, when loaded and executed by the processor 1001, are further operable to execute: receiving information from the access network device on the downlink scheduling resource of the access network device for the UE.

It will be understood by those of ordinary skill in the art that all or part of the operations of the method of the implementations described above may be accomplished by means of a program to instruct associated hardware. The program can be stored in a computer-readable storage medium. The program, when executed, is operable to execute the operations of the implementations of the foregoing method. The storage medium may be a magnetic disk, an optical disk, a read-only memory (ROM) or a random access memory (RAM), etc.

The foregoing description merely depicts some exemplary implementations of the disclosure, which however are not intended to limit the disclosure. Any modifications or equivalent substitutions made based on the appended claims shall all fall in the scope of the disclosure.

Implementations of the disclosure provide a method and device for information transmission and related equipment. By carrying resource indication information in a paging message to indicate an uplink transmission resource of a UE, a probability of uplink-transmission-resource collision between UEs can be reduced.

In a first aspect, implementations of the disclosure provide a method for information transmission. The method is applied to an access network device and includes: transmitting a paging message, where the paging message contains resource indication information of a UE, and the resource indication information indicates an uplink transmission resource of the UE; and receiving information transmitted by the UE on the uplink transmission resource.

In some implementations, the paging message further contains downlink control indication information, where the downlink control indication information contains the resource indication information.

In some implementations, the resource indication information contains an index of a preconfigured uplink resource of the UE.

In some implementations, the paging message further contains preamble information, where the preamble information indicates the UE to transmit a preamble on a corresponding resource.

In some implementations, receiving the information transmitted by the UE on the uplink transmission resource includes: receiving first indication information from the UE, where the first indication information includes beam indication information and/or channel state information, and the first indication information indicates the access network device to perform downlink scheduling according to the first indication information.

In some implementations, the paging message further contains second indication information, where the second indication information indicates a downlink scheduling resource of the access network device for the UE.

In a second aspect, implementations of the disclosure provide a method for information transmission. The method is applied to a UE and includes: receiving a paging message from an access network device, where the paging message contains resource indication information of the UE, and the resource indication information indicates an uplink transmission resource of the UE; and transmitting information to the access network device on the uplink transmission resource.

In some implementations, the paging message further contains downlink control indication information, where the downlink control indication information contains the resource indication information.

In some implementations, the resource indication information contains an index of a preconfigured uplink resource of the UE, and prior to transmitting the information to the access network device on the uplink transmission resource, the method further includes: determining the uplink transmission resource of the UE according to the index.

In some implementations, the paging message further contains preamble information, the preamble information indicates the UE to transmit a preamble on a corresponding resource, and the method further includes: transmitting the preamble to the access network device on the corresponding resource according to the preamble information.

In some implementations, the method further includes: determining a radio network temporary identifier (RNTI) of the UE according to the resource indication information, where the RNTI of the UE corresponds to the resource indication information.

In some implementations, transmitting the information to the access network device on the uplink transmission resource includes: transmitting first indication information to the access network device on the uplink transmission resource, where the first indication information includes beam indication information and/or channel state information, and the first indication information indicates the access network device to perform downlink scheduling according to the first indication information.

In some implementations, the paging message further contains second indication information, the second indication information indicates a downlink scheduling resource of the access network device for the UE, and the method further includes: receiving information from the access network device on the downlink scheduling resource of the access network device for the UE.

In a third aspect, implementations of the disclosure provide a device for information transmission. The device includes a transmission unit and a receiving unit. The transmission unit is configured to transmit a paging message, where the paging message contains resource indication information of a UE, and the resource indication information indicates an uplink transmission resource of the UE. The receiving unit is configured to receive information transmitted by the UE on the uplink transmission resource.

In some implementations, the paging message further contains downlink control indication information, where the downlink control indication information contains the resource indication information.

In some implementations, the resource indication information contains an index of a preconfigured uplink resource of the UE.

In some implementations, the paging message further contains preamble information, where the preamble information indicates the UE to transmit a preamble on a corresponding resource.

In some implementations, the receiving unit configured to receive the information transmitted by the UE on the uplink transmission resource is specifically configured to: receive first indication information from the UE, where the first indication information includes beam indication information and/or channel state information, and the first indication information indicates an access network device to perform downlink scheduling according to the first indication information.

In some implementations, the paging message further contains second indication information, where the second indication information indicates a downlink scheduling resource of an access network device for the UE.

In a fourth aspect, implementations of the disclosure provide a device for information transmission. The device includes a receiving unit and a transmission unit. The receiving unit is configured to receive a paging message from an access network device, where the paging message contains resource indication information of a UE, and the resource indication information indicates an uplink transmission resource of the UE. The transmission unit is configured to transmit information to the access network device on the uplink transmission resource.

In some implementations, the paging message further contains downlink control indication information, where the downlink control indication information contains the resource indication information.

In some implementations, the resource indication information contains an index of a preconfigured uplink resource of the UE, and the device further includes a processing unit configured to: determine the uplink transmission resource of the UE according to the index.

In some implementations, the paging message further contains preamble information, the preamble information indicates the UE to transmit a preamble on a corresponding resource, and the transmission unit is further configured to: transmit the preamble to the access network device on the corresponding resource according to the preamble information.

In some implementations, the processing unit is further configured to: determine an RNTI of the UE according to the resource indication information, where the RNTI of the UE corresponds to the resource indication information.

In some implementations, the transmission unit configured to transmit the information to the access network device on the uplink transmission resource is specifically configured to: transmit first indication information to the access network device on the uplink transmission resource, where the first indication information includes beam indication information and/or channel state information, and the first indication information indicates the access network device to perform downlink scheduling according to the first indication information.

In some implementations, the paging message further contains second indication information, the second indication information indicates a downlink scheduling resource of the access network device for the UE, and the receiving unit is further configured to: receive information from the access network device on the downlink scheduling resource of the access network device for the UE.

In a fifth aspect, implementations of the disclosure provide an access network device. The access network device includes a memory and a processor. The memory stores program codes. The processor is configured to execute the program codes in the memory, to cause the access network device to execute the method in the first aspect or any of the implementations of the first aspect.

In a sixth aspect, implementations of the disclosure provide a UE. The UE includes a memory and a processor. The memory stores program codes. The processor is configured to execute the program codes in the memory, to cause the UE to execute the method in the second aspect or any of the implementations of the second aspect.

In a seventh aspect, implementations of the disclosure provide a communication system. The communication system includes the access network device in the fifth aspect and the UE in the sixth aspect.

In an eighth aspect, implementations of the disclosure provide a non-transitory computer-readable storage medium. The non-transitory computer-readable storage medium includes programs or instructions which, when run by a computer, are operable with the computer to execute the method in the first aspect or any of the implementations of the first aspect.

In a ninth aspect, implementations of the disclosure provide a non-transitory computer-readable storage medium. The non-transitory computer-readable storage medium includes programs or instructions which, when run by a computer, are operable with the computer to execute the method in the second aspect or any of the implementations of the second aspect.

In a tenth aspect, implementations of the disclosure provide a chip or a chip system. The chip or chip system includes at least one processor and an interface. The interface and the at least one processor are interconnected via a line. The at least one processor is configured to run computer programs or instructions to execute the method in the first aspect or any of the implementations of the first aspect.

In an eleventh aspect, implementations of the disclosure provide a chip or a chip system. The chip or chip system includes at least one processor and an interface. The interface and the at least one processor are interconnected via a line. The at least one processor is configured to run computer programs or instructions to execute the method in the second aspect or any of the implementations of the second aspect.

What is claimed is:

1. A method for information transmission, performed by an access network device and comprising:
    transmitting a paging message, the paging message containing resource indication information of a user equipment (UE), and the resource indication information indicating an uplink transmission resource of the UE; and
    receiving first indication information from the UE on the uplink transmission resource, the first indication information indicating the access network device to perform downlink scheduling according to the first indication information, and the first indication information comprising channel state information (CSI); and
    adjusting, according to the CSI, configurations of a modulation mode, resource allocation, and multiple-input multiple-output (MIMO) of the UE.

2. The method of claim 1, wherein the paging message further contains downlink control indication information, the downlink control indication information contains the resource indication information.

3. The method of claim 1, wherein the resource indication information contains an index of a preconfigured uplink resource of the UE.

4. The method of claim 1, wherein the paging message further contains preamble information, the preamble information indicates the UE to transmit a preamble on a corresponding resource.

5. The method of claim 1, wherein the first indication information further comprises beam indication information.

6. The method of claim 1, wherein the paging message further contains second indication information, the second indication information indicates a downlink scheduling resource of the access network device for the UE.

7. A method for information transmission, performed by a user equipment (UE) and comprising:
    receiving a paging message from an access network device, the paging message containing resource indication information of the UE, and the resource indication information indicating an uplink transmission resource of the UE; and
    transmitting first indication information to the access network device on the uplink transmission resource, the first indication information indicating the access network device to perform downlink scheduling according to the first indication information, the first indication information comprising channel state information (CSI), and the CSI is used for the access network device to adjust configurations of a modulation mode, resource allocation, and multiple-input multiple-output (MIMO) of the UE.

8. The method of claim 7, wherein the paging message further contains downlink control indication information, the downlink control indication information contains the resource indication information.

9. The method of claim 7, wherein the resource indication information contains an index of a preconfigured uplink resource of the UE, and prior to transmitting the information to the access network device on the uplink transmission resource, the method further comprises:
    determining the uplink transmission resource of the UE according to the index.

10. The method of claim 7, wherein the paging message further contains preamble information, the preamble information indicates the UE to transmit a preamble on a corresponding resource, and the method further comprises:
  transmitting the preamble to the access network device on the corresponding resource according to the preamble information.

11. The method of claim 7, further comprising:
  determining a radio network temporary identifier (RNTI) of the UE according to the resource indication information, wherein the RNTI of the UE corresponds to the resource indication information.

12. The method of claim 7, wherein the first indication information further comprises beam indication information.

13. The method of claim 7, wherein the paging message further contains second indication information, the second indication information indicates a downlink scheduling resource of the access network device for the UE, and the method further comprises:
  receiving information from the access network device on the downlink scheduling resource of the access network device for the UE.

14. An access network device, comprising:
  a transceiver;
  a memory, coupled with the transceiver; and
  a processor, coupled with the transceiver and the memory, and configured to cause the transceiver to:
    transmit a paging message, the paging message containing resource indication information of a user equipment (UE), and the resource indication information indicating an uplink transmission resource of the UE;
    receive first indication information from the UE on the uplink transmission resource, the first indication information indicating the access network device to perform downlink scheduling according to the first indication information, and the first indication information comprising channel state information (CSI); and
    adjust, according to the CSI, configurations of a modulation mode, resource allocation, and multiple-input multiple-output (MIMO) of the UE.

15. A user equipment (UE), comprising:
  a transceiver;
  a memory, coupled with the transceiver; and
  a processor, coupled with the transceiver and the memory, and configured to cause the transceiver to execute the method of claim 7.

16. The access network device of claim 14, wherein the paging message further contains downlink control indication information, the downlink control indication information contains the resource indication information.

17. The access network device of claim 14, wherein the resource indication information contains an index of a preconfigured uplink resource of the UE.

18. The access network device of claim 14, wherein the paging message further contains preamble information, the preamble information indicates the UE to transmit a preamble on a corresponding resource.

19. The access network device of claim 14, wherein the first indication information further comprises beam indication information.

20. The access network device of claim 14, wherein the paging message further contains second indication information, the second indication information indicates a downlink scheduling resource of the access network device for the UE.

* * * * *